United States Patent [19]

Patt et al.

[11] Patent Number: 4,767,500
[45] Date of Patent: Aug. 30, 1988

[54] SULFITE COOKING METHOD FOR THE PRODUCTION OF CELLULOSE FROM MATERIALS CONTAINING LIGNOCELLULOSE WITH RECOVERY OF THE COOKING CHEMICALS

[75] Inventors: Rudolf Patt, Reinbek; Othar Kordsachia, Oststeinbek, both of Fed. Rep. of Germany

[73] Assignee: Kraftanlagen Aktiengesellschaft, Fed. Rep. of Germany

[21] Appl. No.: 93,086

[22] Filed: Aug. 27, 1987

Related U.S. Application Data

[63] Continuation-in-part of Ser. No. 864,010, May 16, 1986, abandoned.

[30] Foreign Application Priority Data

May 18, 1985 [DE] Fed. Rep. of Germany ....... 3518005

[51] Int. Cl.$^4$ ........................ D21C 3/20; D21C 11/02
[52] U.S. Cl. ........................................ 162/32; 162/36; 162/72; 162/77; 162/83
[58] Field of Search ....................... 162/36, 32, 29, 72, 162/77, 83

[56] References Cited

U.S. PATENT DOCUMENTS

| | | | |
|---|---|---|---|
| 2,947,657 | 8/1960 | Peteri | 162/83 |
| 3,368,935 | 2/1968 | Heald et al. | 162/83 |
| 3,822,180 | 7/1974 | Mita et al. | 162/36 |
| 3,826,710 | 7/1974 | Anderson | 162/36 |
| 4,213,821 | 7/1980 | Vanderhock et al. | 162/72 |
| 4,496,426 | 1/1985 | Baumeister et al. | 162/77 |

FOREIGN PATENT DOCUMENTS 930905 7/1973 Canada ................................ 162/36

OTHER PUBLICATIONS

Hauki et al., "The Chemical Cycle and Recovery of Chemicals in NS-AQ Pulping"; Pulp Paper Canada 85:5 (1984) p. 65 paper presented 10-1982.
Davies et al., "Recovering Chemicals in a Closed Sulfite Mill," Tappi Journal, vol. 66, No. 7; Jul. 1983 p. 47.
Shick et al. "Development in Recovery of Sulfite Cooking Chemicals", Tappi, vol. 56, No. 8; Aug. 1973.

Primary Examiner—Steve Alvo

[57] ABSTRACT

A sulphite cooking process is described for the production of pulp from materials containing lignocelluloses, with recovery of the cooking chemicals, in which the cooking, the blowing, the washing and the bleaching are performed sucessively. The waste liquor is subjected to several thermal treatments for the recovery of the cooking chemicals. For the cooking of the lignocellulosic materials, alkaline sulphite solutions are used, to which one or, in mixture, several low-boiling solvents are added, as well as at least one compound suitable as a redox catalyst.

19 Claims, 2 Drawing Sheets

SULFITE COOKING METHOD FOR THE PRODUCTION OF CELLULOSE FROM MATERIALS CONTAINING LIGNOCELLULOSE WITH RECOVERY OF THE COOKING CHEMICALS

This application is a continuation-in-part of application Ser. No. 864,010, filed May 16, 1986, now abandoned.

BACKGROUND OF THE INVENTION

The invention relates to a sulfite cooking method for the production of cellulose from materials containing lignocellulose with recovery of the cooking chemicals, especially with series connection of cooking, blowing, pulp washing and bleaching with a multiple thermal treatment of the black liquor for recovery of the cooking chemicals.

The main methods for pulp production, the sulfate process and the sulfite process, suffer from considerable disadvantages. With regard to the amounts of pulp produced, the sulfate process is the dominating one worldwide, since it is applicable to all materials containing lignocellulose, and the pulp produced has good technological properties. An important disadvantage of this process is the air pollution by the offensive odor of reduced sulfur compounds that are generated, on the one hand, plus the difficulties of bleaching, combined with considerable waste-water problems on the other. In contrast to this, sulfite pulps are more easily bleachable on account of the decidedly lower lignin content after cooking, and the better solubility of this residual lignin. The raw material that can be used for sulfite pulping is, however, limited, it requires cleaner debarking of the wood because incomplete disintegration of the bark in cooking results in impurities of the pulp. Furthermore, the technological properties of the pulp are decidedly inferior to those of sulfate pulp.

In the known sulfite cooking processes for pulp production from wood or annual plants the digesting of the lignocellulosic materials is carried out with solutions of sulfites or hydrogen sulfites, having an acid or neutral pH-adjustment. Processes in which the hydrogen sulfite solutions additionally contain sulfur dioxide are referred to as acid bisulfite processes. Of these sulfite cooking processes, the magnesium bisulfite process has acquired considerable importance as an alternative to the calcium bisulfite process, since in this case magnesium oxide and sulfur dioxide, which are washed out from the exhaust gases of the black liquor can be recovered for preparation of fresh cooking liquor. Thus, only small amounts of make-up chemicals have to be added in the recovery to compensate the losses. In comparison to the calcium bisulfite process, the costly acid towers for the production of cooking acid are eliminated, and a substantial part of the total sulfur dioxide emission is avoided by washing the sulfur dioxide out of the exhaust gases from the black liquor burning.

To make the production of pulp less harmful to the environment and to enhance its profitability, it has been proposed to add anthraquinone to the cooking liquor in alkaline cooking processes. As a redox catalyst in alkaline cooking processes, anthraquinone accelerates the delignification and stabilizes the reducing ends of the carbohydrates against alkaline "peeling-off." Pulp in higher yields and of better strength properties are the result. Furthermore, the use of anthraquinone makes it possible also to use the sulfur-free soda process for the production of chemical pulps (Holton, H. H. and F. L. Chopman: Kraft Pulping with Anthraquinone: Laboratory and Full-Scale Mill Trials. TAPPI 60, 11, 49-53 (1977)).

Based on the knowledge of the reaction mechanism of anthraquinone, investigations have been carried through to use anthraquinone in alkaline sulfite processes for pulp production. A substantial drawback of this known process, however, is that the residual lignin content cannot be reduced below Kappa number 40, when at the same time pulp yield and quality must be kept on a certain standard. The production of pulp with a high residual lignin content, however, contradicts the efforts to support the lignin-removing function of the bleaching by intensified delignification in cooking and to reduce environmental pollution by waste bleaching liquor (Ingruber, O. V., M. Stredel and J. A. Histed: Alkaline Sulphite-Anthraquinone Pulping of Eastern Canadian Woods. Pulp Paper Mag. Can. 83, 12, 79-88, 1982; Kettunen, J., N. E. Virkola and I. Yrjala: The Effect of Anthraquinone on Neutral Sulphate and Alkaline Sulphite Cooking of Pine. Paperi ja Puu 61, 685-700, 1979; Rauben-heimer, S. and H. Eggers: Zellstoffkochung mit Sulfit und Anthrachinon, Paper 34, 10, V19-V23, 1980).

To eliminate this disadvantage, a two-stage sulfite cooking method has been proposed involving addition of anthraquinone in the first alkaline stage and addition of sulfur dioxide in the second stage, for further reducing the lignin content of the pulp. Disadvantageous, however, is the long time required for the digestion, amounting about twice that of sulfate cooking, and the technological difficulties arising from the two-stage process (Patt, R. and B. Beck: Integrale Holznutzung bei alkalischen Sulfitverfahren unter Zusatz von Anthrachinon. Mitt. Bundesforschungsan- stalt fuer Forstund Holzwirtschaft, Hammburg, No. 146, 1984, 222-233). Also known is a proposal to digest wood with a mixture of water and alcohol. The disadvantage of this proposal is, however, that especially the dissolution of the lignin of softwoods is only possible to a limited extent. Also, the celluloses produced with a pulps still containing a relatively high residual lignin content have unsatisfactory technological properties and the pressure in the digester results in considerable problems on the large technical scale (Kleinert, T. N.: Organosolv Pulping with Aqueous Alcohol. TAPPI 57, 99-102, 1974).

In further development of the above solution it was therefore proposed to add inorganic chemicals to organic solvents in the form of alcohols. It was suggested to use caustic soda solution in addition to methanol or ethanol and to add anthraquinone to the cooking liquor. The disadvantage of this process, which is still under development, consists in the necessary high cooking temperatures and pressures, the low bleachability of the pulp, and the problems and the great expense involved in the recovery of the chemicals, which has to be performed by burning the black liquor and then causticizing the green liquor (Edel, E.: Das MD-Organosolv-Zellstoffverfahren. Deutsche Papierwirtschaft 1, 39-45, 1984; Nakano, J., H. Daima, S. Hosya and A. Ishizu: Studies on Alkali-Methanol Cooking. Ekman Days Stockholm, 2, 72-77, 1981).

Proven methods for the recovery of the cooking chemicals from a sodium sulfite digestion operate with a pyrolytic decomposition of the evaporated black liquor under certain conditions concerning temperature and oxygen. (Technol., Stockholm (223): 26 pp (1964) and Bjoerkman, A., Proc. Iupac/Eucepa Symp. on Recovery of Pulping Chemicals (Helsinki) 1968 pp 235–265 (Fin. Pulp and Paper Res. Inst. (1969).

The injection of concentrated black liquor in form of a fine spray into a vertical cylindrical pressure reactor while preventing any access of air or oxygen has already been introduced; the wall temperatures of the reactor amounted to between 700° and 800° C. This results in a conversion to finely divided solids in the form of sodium carbonate, some Glauber's salt, and carbon. Sodium sulfide in this case is not contained in the solid residues, and the accompanying organic substances are gassified, while the sulfur in the black liquor occurs in the pyrolysis has as hydrogen sulfide. The hot pyrolysis gases are then separated in a cyclone from the solids, oxidized, and reacted with the fresh liquor. Carbon from the leaching of the solid pyrolysis residue can be burned for additional heat recovery. Such a method of recovering the cooking chemicals is relatively simple. Difficulties consist in selection of a suitable material on account of the high corrosiveness of the reaction products (Barclay, H. G., Prahacs, S., and Gravel, J. J. O., Pulp and Paper Mag. Can. 65 (12): T 553 (1964); Gauvin, W. H. and Gravel, H. J. O, TAPPI 43 (8): 678/1960).

Finally, a method is known for the recovery of cooking chemicals from bisulfite black liquors which uses, instead of an indirectly heated steel reactor, a reactor having a masonry lining, which is heated directly with exhaust gases from an oil burner. The retention time in the pyrolysis reactor amounts to only a few seconds. The sulfur contained in the black liquors is converted to hydrogen sulfide, and the sodium compounds are converted to sodium carbonate. The solid pyrolysis residue contains large amounts of carbon and is first passed through a waste-heat boiler, and the dry powder thus obtained is separated from the gas in a two-stage separator. The pyrolysis gases are cooled in a washer, the water vapor is separated, and the gases afterburned and passed through an additional waste-heat boiler to recover the combustion heat. The solids obtained in the separator are mixed with water, sodium carbonate is leached out, and the sodium carbonate solution is filtered to separate the carbon. The sodium carbonate solution obtained is combined with sulfur dioxide from the afterburning of the pyrolysis gases and used for the preparation of the cooking liquor. Problems with material thickness and selection for the pyrolysis reactor are in this case circumvented. The direct introduction of the hot exhaust gases from the oil burner permits the pyrolysis reactor to be lined with masonry. However, the high content of carbon in the solid pyrolysis residues is a disadvantage. The carbon content in this case can be reduced only by the selection of high reaction temperatures, but this leads to deposits on the reactor walls. Thus also the leaching out of sodium compounds is just as limited as is the recovery of cooking chemicals (Horntvedt, E., TAPPI 53 (11): 2147 (1970)).

The present invention is addressed to the problem of creating a sulfite digesting process for the production of pulp from materials containing lignocellulose, which will combine the advantages of the sulfate and sulfite processes, but will avoid the disadvantages involved in these processes, and especially a process which will make it possible to obtain from cellulose-containing materials of a great variety of origins a high yield of a highly digested pulp of very good strength characteristics, with recovery of the cooking chemicals.

DESCRIPTION OF THE INVENTION

Setting out from a process of the kind mentioned above, this problem is solved according to this invention by using for the digestion water-soluble, alkaline sulfite solutions, and adding thereto one or a mixture of more than one low-boiling organic solvents as well as at least one compound that is suitable as a redox catalyst. By this method, all available raw materials for the manufacture of pulp, including their bark content, can be digested in a short time, with extraordinarily high yields, to celluloses of low residual lignin content, high brightness, easy bleachability, and strength properties never before achieved in other pulping processes.

The use of low-boiling solvents in amount of 10 to 60%, preferably 15 to 30%, the cooking liquor has proven to be especially desirable. Wood extracts in the form of resins and terpenes are dissolved and thus the penetration of the digesting agents is improved. At the same time the solubility of the redox catalyst is promoted and a further delignification is accomplished.

The choice of a quinone derivative as the redox catalyst, particularly anthraquinone or anthrahydroquinone, is especially advantageous to promote delignification and the simultaneous stabilization of the carbohydrates during the digestion. It is furthermore advantageous to add the quinone derivative to the digesting solution in amount of 0.05 to 0.5%, especially 0.1%, based on dry wood. The reduced form of the quinone derivative reduces the lignin, thereby being itself oxidized, and oxidizes the reducing end groups of the carbohydrates, and is thereby itself again reduced. The end groups of the carbohydrates are thereby stabilized against alkaline degradation. Anthraquinone has an especially great effect on the required properties. Besides, it is surprisingly found that, after the digestion, the anthraquinone floats in solid form on the black liquor and thus can be separated and recovered in the simplest manner.

A pure alkali sulfite solution, especially a sodium sulfite or ammonium sulfite solution, advantageously leads to a very light-colored, easily bleachable pulp in very high yields.

Although the addition of sodium or ammonium hydroxide or carbonate to the digesting solution with still a predominant amount of sulfite reduces the yield and brightness, particularly the average degree of polymerization of the cellulose and the tear strength of the pulp are positively influenced, and first of all the time required for digestion is substantially reduced. In this case the influence of caustic soda is stronger than that of carbonate.

Especially advantageous for the overall use of cooking chemicals is a liquor ratio between 1:2 and 1:8. Surprisingly, digestion can now be performed with a lower liquor ratio in comparison to previously known processes which operate with organic solvents, whereby the delignification is accelerated, the pulp yield and strength are increased, and the energy required by the process is considerably reduced.

To reduce the cooking time to 30 to 240 minutes, it is advantageous to select a cooking temperature between 160° and 190° C. according to the boiling point of the organic solvent used and its content in the cooking liquor, resulting in a pressure of between 8 and 16 bar. Depending on the raw material used, the desired quality of the pulp, and the selected cooking conditions, the cooking time is to be selected between 30 and 240 minutes.

Solvents are recovered by recycling the organic solvents directly from the digester process and/or from the evaporation of the black liquor. The concentration of the black liquor by evaporation and its thermal degradation in a reducing atmosphere leads to a melt containing $Na_2S$ and $Na_2CO_3$ from which the alkali compounds of the cooking liquor can be dissolved out in a simple manner as inorganic cooking chemicals. The $Na_2S$ of the melt is converted to $Na_2CO_3$ and $H_2S$. At the same time the hydrogen sulfide, as the gaseous product of the thermal degradation, can be converted to sulfur dioxide in order to use it for the sulfitation of the inorganic cooking chemicals dissolved out of the the melt, thereby also completing the recovery of the inorganic cooking chemicals and the preparation of fresh cooking liquor. The gases which contain hydrogen sulfide and have a high heat value can be converted to sulfur dioxide in a waste-heat boiler, using preferably sulfurous heavy oils as additional fuel, thus compensating the sulfur losses in the cooking chemical cycle.

Leaching with water is advantageous for dissolving the alkali compounds out of the solid products of the thermal degradation as well as its subsequent separation. In this manner, the accompanying carbon can be separated most simply from the alkali carbonate by filtration in a subsequent process stage.

The carbon separated by filtration from the aqueous alkali carbonate can likewise be added advantageously to the fuel for the oxidation of the sulfur compounds in the gaseous products of the thermal degradation of the concentrated black liquor, or it can be used as an activating adjuvant and adsorbent in the biological purification of the bleaching effluents, or it can be exploited commercially outside of the process.

In order to achieve a uniform temperature control and distribution during the thermal degradation of the concentrated black liquor, prevent caking on the walls of the reactor, and also obtain easily soluble solid products, it is especially advantageous to divide the process into several subsequent stages including a comminution, especially with a horizontal principal stream with a vertical component, to produce a continuous stirring action.

The sulfur bound organically and inorganically in the concentrated black liquor can be released as hydrogen sulfide within the reactor at temperatures between 500° and 850° C. and retention times of 30 to 120 minutes in a reducing atmosphere at a low pressure level, low gas velocities and low dust discharge, as well as low corrosive and erosive effects, while keeping the chemical losses especially low. This treatment of the black liquor at the same time creates the possibility of including in the thermal degradation the mechanically thickened clarifying sludge from a biological purification of the bleaching effluents, with the complete conversion of the alkali compounds contained therein to carbonates.

The use of chlorine-free bleaching chemicals applying the same bases as in the cooking liquor, opens the way to the recycling of these bleaching effluents into the general black liquor cycle.

The process makes it possible to install an effluent-free pulp mill by the fact that the pulps can be delignified to an extraordinarily high extent and have even unbleached a high degree of brightness. The removal of the residual lignin still present can be accomplished with chlorine-free chemicals such as oxygen, ozone, or hydrogen peroxide. If chlorine-containing bleaching chemicals are additionally used to meet especially high brightness requirements, they can be added in form of chlorine dioxide in such small amounts that the chlorine level of the general black liquor cycle can be kept below a critical limit.

The greatest part of the low-boiling organic solvent used for the cooking liquor is already separated by condensation when the black liquor is relieved and after cleaning in a stripper it is recycled to fresh cooking liquor. The remaining part of the solvent passes from the black liquor evaporator through the stripper and likewise into this liquor cycle. The formation of carbonates from the organic and inorganic alkali compounds of the concentrated black liquor by thermal degradation at appropriate temperatures and pressures in a reducing atmosphere avoids any undesired formation of sodium thiosulfate and permits the cooking and bleaching effluents to be treated together, whereby the water cycle is closed just like the cycle of the organic solvents and of the cooking chemicals.

The method according to the invention is represented diagrammatically in the drawings to explain the idea thereof.

Figure 1:
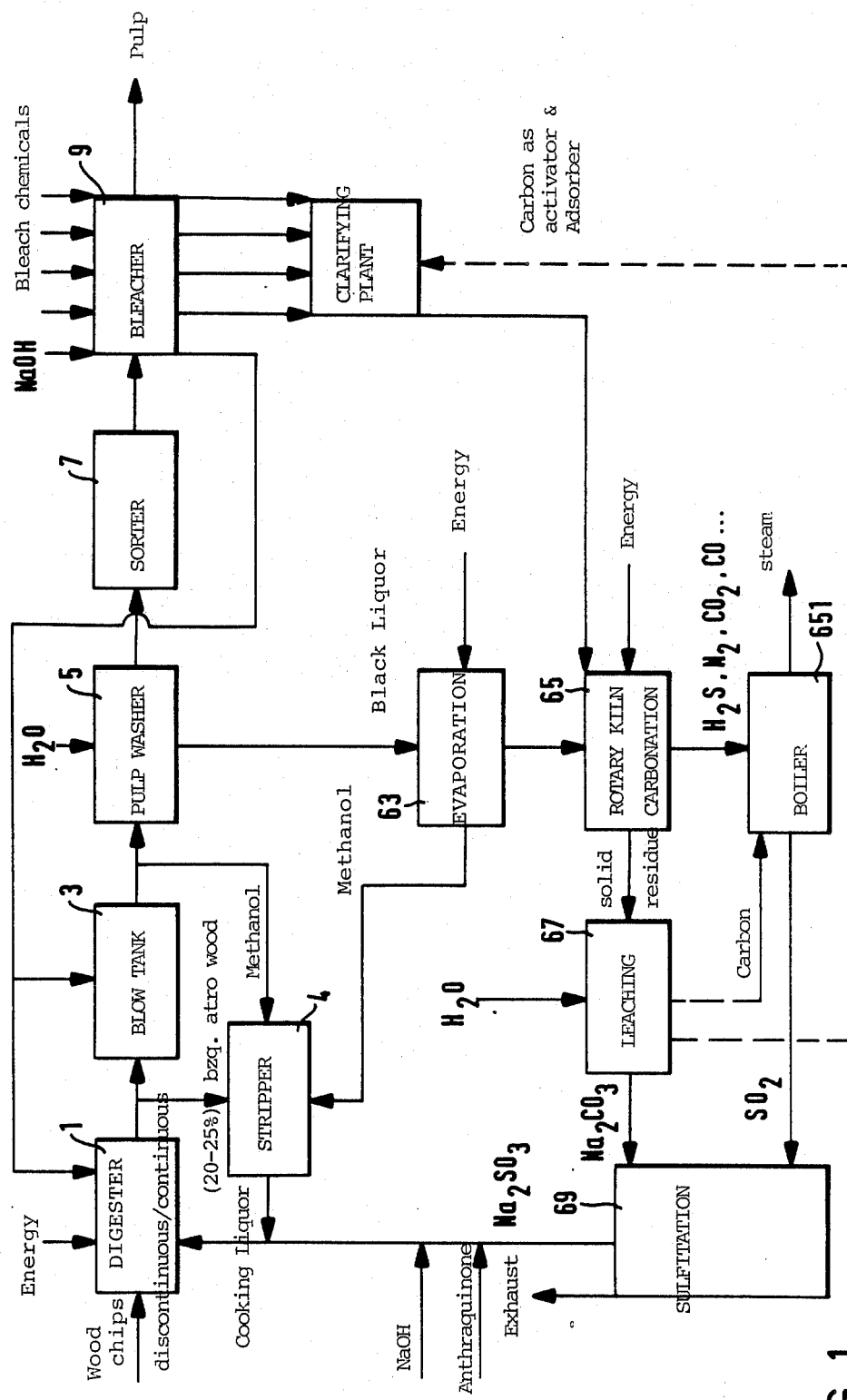
FIG. 1 schematically shows one embodiment of the process of the invention.
Figure 2:
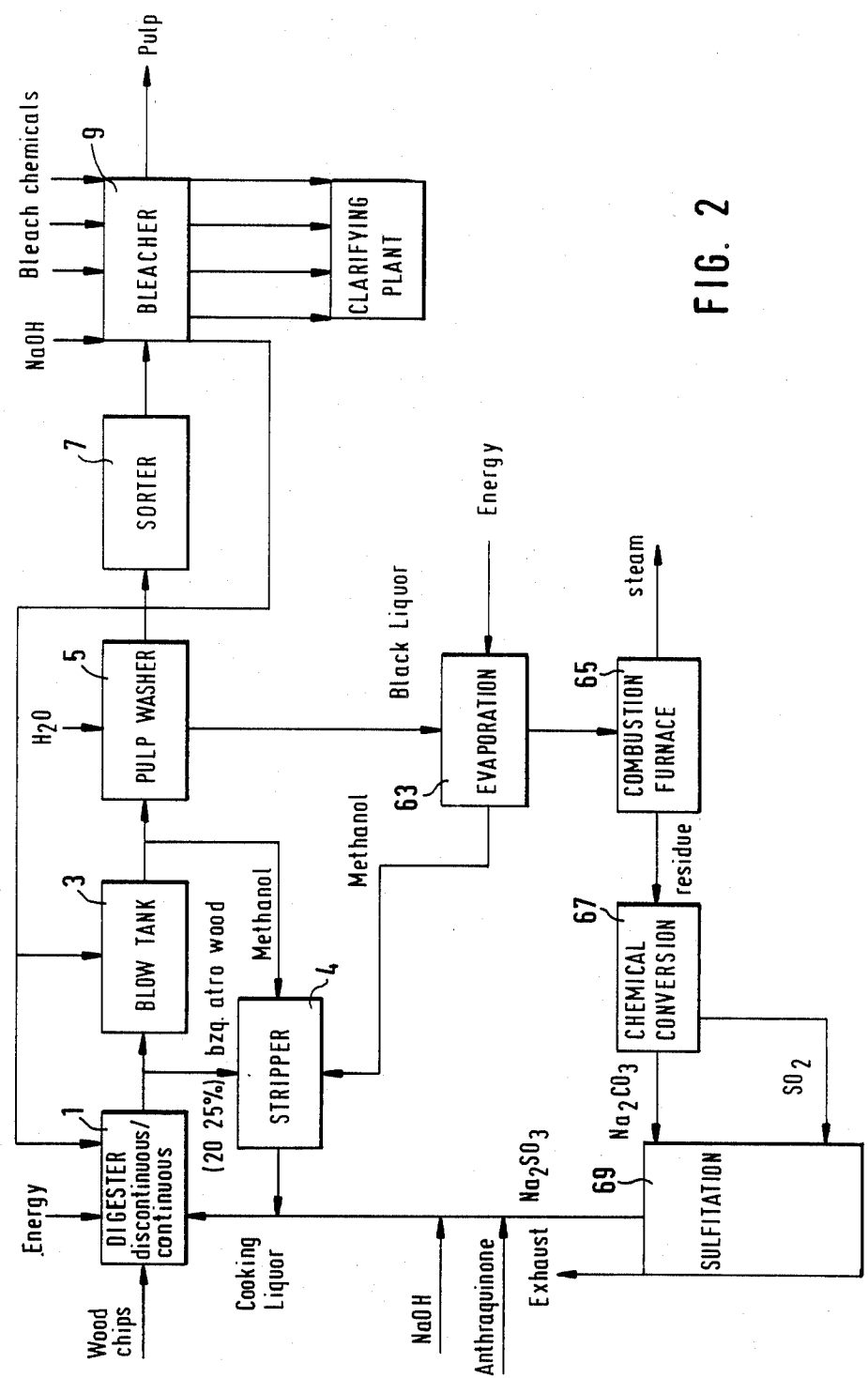
FIG. 2 schematically shows another embodiment of the invention.

The wood chips or annual plants are fed to the cooker 1 and are digested therein with a water-soluble alkali sulfite solution as the inorganic digesting chemical, with the addition of anthraquinone as the redox catalyst and of methanol as the organic digesting chemical. At the end of the cook the digester is relieved and its content is transferred to the blow tank 3. By the relief of the pressure most of the organic solvent in the cooking liquor is released and then condensed, and purified in a stripper 4 thus recovering most of the organic solvent in order to feed it back into the fresh cooking liquor. The black liquor is separated from the pulp in a washer 5 with the supply of water and heat. The separated pulp passes through the screening 7 into the bleaching plant 9. The waste liquor from the washer 3 is fed to a multi-stage evaporator 63, while the waste liquors of the alkali stage of the pulp bleaching plant 9 are fed back through the boiler 1 and the blow tank 3 into the general waste liquor cycle. A methanol residue from the evaporator is likewise introduced into the stripper 4. The concentrated black liquor withdrawn from the final stage of the evaporator is fed to a rotary kiln 65 in which the carbonation is performed in a reducing atmosphere with indirect heating. The retention time in the rotary kiln is regulated mainly by the water content of the feed-liquor. The solid residue from the carbonation is fed to a leaching tank 67 to wash out the carbonate. From the leaching tank the carbonate and water are transferred to the sulfitation apparatus 69. Fresh liquor and redox catalyst, plus the recycled organic solvent are added to the alkali sulfite produced in the sulfitation apparatus to compensate the chemical loss occurring in the different stages of the process, to prepare the cooking liquor and then feed back again to the cooker. The gaseous products of the carbonation of the concentrated black liquor in the rotary kiln 65 are fed to a waste-heat boiler 651 to be burned, with energy recovery, at temperatures between 900° and 1200° C., together with the carbon filtered out of the leaching tank to burn it as an added fuel. In the waste heat boiler the hydrogen sulfide, as a gaseous part of the thermal degradation, i.e., the carbonation of the concentrated black liquor, is oxidized to sulfur dioxide. The sulfur dioxide obtained is used for the conversion of the carbonate in the sulfitation apparatus, thus completing the cycle of the recovery of the chemicals.

EXAMPLES

Example 1

In a 7-liter rotary autoclave, 1200 g (500 g absolutely dry) of pine chips were cooked in an alkaline sulfite solution having an initial pH of 13.6, with a total liquor ratio of 4:1 and a water-methanol ratio of 65:35 percent by weight. The chemical input, calculated as NaOH, amounted to 25% of the absolutely dry wood input, of which 80% consisted of sodium sulfite and 20% of sodium hydroxide. Before it was filled into the digester, 0.2% of anthraquinone was added to this cooking liquor, with respect to the absolutely dry wood. The heating time up to the maximum temperature of 175° C., corresponding to a pressure of 13.5 bar, amounted to 80 minutes. The cooking time at maximum temperature for cook 1a was held to 150 minutes and for cook 2b it was held to 150 minutes, and the digester was then relieved; relieving time was about 40 minutes. For a pulp produced in this manner, after washing in water and beating in the laboratory pulper, the following characteristic data were obtained:

|  | Cooking 1a | Cooking 1b |
| --- | --- | --- |
| Total yield (%) | 50 | 49.5 |
| Rejects (%) | 0.5 | 0.3 |
| Kappa number | 24.7 | 22.8 |
| Brightness (% ISO) | 53.4 | 54.8 |
| $DP_w$ | 4582 | 5066 |
| Freeness after 30 minutes Jokro (°SR) | 26 | 25 |
| Breaking length (m) | 12110 | 12200 |
| Tearing strength (cN) | 93.2 | 99.2 |
| Bursting area (m$^2$) | 88 | 88.6 |

Example 2

The digesting of the pine chips was performed as in Example 1b (cooking time 180 min at maximum temperature), but instead half of the NaOH content in the cooking liquor in the one case, and all of the NaOH content in the other, was replaced with sodium carbonate (cooking 2a chemical composition 80/10/10) (cooking 2b: 80/0/20), causing the initial pH of the cooking liquor to be lowered to 13.2 and 12.2, respectively.

For the pulp produced in this manner the following analyses were obtained:

|  | Cooking 2a | Cooking 2b |
| --- | --- | --- |
| Total yield (%) | 50.2 | 51.7 |
| Rejects (%) | 0.7 | 1.0 |
| Kappa number | 24.8 | 29.5 |
| Brightness (% ISO) | 52.1 | 54.7 |
| $DP_w$ | 4181 | 4118 |
| Freeness after 30 min Jokro (°SR) | 22.0 | 23.0 |
| Breaking length (m) | 11710 | 11910 |
| Tearing strength (cN) | 93.2 | 92.1 |
| Bursting area (m$^2$) | 82.1 | 80.5 |

Example 3

Industrially produced beechwood chips were used for pulp production under the same conditions as in Example 1, but the cooking time at maximum temperature of 175° C. was limited to 120 minutes. The following results were obtained:

| Yield (%) | 51.7 |
| --- | --- |
| Rejects (%) | 1.6 |
| Kappa number | 12.2 |
| Brightness (% ISO) | 60.0 |
| Freeness after 30 min Jokro (°SR) | 25 |
| Breaking length (m) | 8350 |
| Tearing strength (cN) | 92.9 |
| Bursting area (m$^2$) | 60.9 |

Example 4

Under the conditions of Example 3, but with the use of sodium carbonate instead of sodium hydroxide, birch chips were digested. The following results were obtained:

| Total yield (%) | 57.2 |
| --- | --- |
| Rejects (%) | 3.6 |
| Kappa number | 22.2 |
| Brightness (% ISO) | 63.3 |
| Freeness after 30 min Jokro (°SR) | 22 |
| Breaking length (m) | 11030 |
| Bursting area (sq.m.) | 84.6 |

We claim:

1. In a sulfite cooking process for the production of pulp from lignocellulose materials wherein said process includes sequential steps of cooking, blowing, washing, and bleaching, and wherein solutions used in the cooking process are recycled in the process, the improvement which comprises cooking of the lignocellulose materials with a cooking solution of a water-soluble alkaline sulfite compound, and alcohol, and a quinone redox catalyst wherein said alcohol comprises about 10 to 60% of said cooking solution; and wherein said water-soluble alkaline sulfite compound and said alcohol are recovered from one or more of said steps subsequent to said cooking step, and wherein the recovered sulfite compound and alcohol are recycled to said cooking solution for further cooking of the lignocellulose materials.

2. The process according to claim 1, characterized in that anthraquinone or anthrahydroquinone is added to the cooking solution as a redox catalyst.

3. A sulfite cooking process for the production of pulp from lignocellulosic materials including cooking, blowing, pulp washing, and bleaching steps comprising:
    (A) cooking said lignocellulosic materials with a cooking solution containing at least one water-soluble alkaline sulfite compound, an alcohol, and a quinone compound redox catalyst, to form a pulp cooking liquor wherein said alcohol comprises about 10 to 60% of said cooking solution;

(B) washing said cooking liquor and thereby separating said pulp cooking liquor into a pulp component and a black liquor component;
(C) evaporating said black liquor to form a concentrated black liquor, and an alcohol for recycling into said cooking solution of step A;
(D) thermally degrading said concentrated black liquor in a reducing atmosphere to form a solid residue;
(E) leaching said solid residue to form an alkali carbonate, and an alkali sulfite compound for recycling into said cooking solution of step A; and
(F) sulfiting said alkali carbonate with sulphur dioxide to form an alkali sulphite compound for recycling into said cooking solution of step A.

4. Process according to claim 3, characterized in that anthraquinone or anthrahydroquinone is added to the cooking solution as redox catalyst.

5. The process according to claim 3, characterized in that said quinone compound is added to the cooking solution in the amount of about 0.05 to 0.5% of the input dry plant raw material.

6. Process according to claim 3, characterized in that a pure monosulfite solution on a basis of sodium or ammonium is used for the pulping process.

7. Process accordance to claim 6, characterized in that corresponding carbonates with a predominant content of said monosulfite solution is added to the cooking liquor.

8. The process according to claim 6, characterized in that corresponding hydroxides with a predominant content of the monosulfite solution is added to said cooking liquor.

9. Process according to claim 3, characterized in that the ratio of said lignocellulosic material to the total cooking liquor is chosen between 1:2 and 1:8.

10. Process according to claim 9, characterized in that the maximum cooking temperature is set between 160° and 190° C. and the pressure in the range between 8 and 16 bar.

11. Process according to claim 9, characterized in that the cooking time is in the range between 30 and 240 minutes.

12. Process according to claim 10, characterized in that said alkali carbonates are dissolved out of said solid residue of the thermal degradation by means of water.

13. Process according claim 12, characterized in that the carbon content of said solid residue is separated by filtration and fed as fuel to the oxidation of the sulfur compounds in the exhaust gases of the thermal degradation.

14. The process of claim 3, further characterized in that said bleaching step is chlorine free, and effluents from said bleaching step are recycled into at least one of the following steps: said pulp cooking liquor of said step A, and the thermal degradation process of step D.

15. Process according to claim 13, characterized in that the thermal degradation of the cooking black liquor is performed in a plurality of stages in a reducing atmosphere, and the solid products formed in the first stage are continually removed from the heat-transfer surfaces of the reactor and comminuted in the following stages.

16. Process according to claim 15, characterized in that the thermal degradation of the cooking liquor is performed by indirect heating with a substantially horizontal stream of substance, and with a component at right angles thereto for a stirring of the solids.

17. Process according to claim 16, characterized in that the thermal degradation is performed in a reducing atmosphere at temperatures between 500° and 850° C. for a retention time between 30 and 120 minutes.

18. The process of claim 3, further characterized in that the carbon content of the leached solid residue is recycled and used as an activating adjuvant and absorber in the biological purification of bleaching effluents from the bleaching step.

19. A sulfite cooking process for the production of pulp from lignocellulosic materials including cooking, blowing, pulp washing, and bleaching steps comprising:
(A) cooking said lignocellulosic materials with a cooking solution containing at least one water-soluble alkaline sulfite compound, an alcohol, and a quinone compound redox catalyst to form a pulp cooking liquor wherein said alcohol comprises about 10 to 60% of said cooking solution;
(B) washing said cooking liquor and thereby separating said pulp cooking liquor into a pulp component and a black liquor component;
(C) evaporating said black liquor to form a concentrated black liquor, and an alcohol for recycling into said cooking solution of step A;
(D) thermally degrading said concentrated black liquor in a reducing atmosphere to form a melt containing $Na_2S$ and $Na_2CO_3$;
(E) converting said $Na_2S$ into $Na_2CO_3$ and $H_2S$ and oxidizing said $H_2S$ into $SO_2$; and
(F) sulfiting said alkali carbonate with said sulphur dioxide to form a sulphite compound for recycling into said cooking solution of step A.

* * * * *